United States Patent
Haque et al.

(10) Patent No.: US 7,657,785 B2
(45) Date of Patent: Feb. 2, 2010

(54) SYSTEM OF CIRCUMVENTION AND RECOVERY IN A MULTI-FUNCTION SYSTEM

(75) Inventors: Jamal Haque, Tampa, FL (US); Andrew W. Guyette, Clearwater, FL (US); Edward R. Prado, Palm Harbor, FL (US); Keith A. Souders, Tampa, FL (US); Paris Wiley, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 379 days.

(21) Appl. No.: 11/672,068

(22) Filed: Feb. 7, 2007

(65) Prior Publication Data
US 2008/0189444 A1    Aug. 7, 2008

(51) Int. Cl.
*G06F 11/00* (2006.01)
(52) U.S. Cl. .............................. 714/13; 711/15; 711/18
(58) Field of Classification Search .................. 714/13; 711/15, 18
See application file for complete search history.

(56) References Cited

U.S. PATENT DOCUMENTS

| | | | |
|---|---|---|---|
| 4,413,327 A | 11/1983 | Sabo et al. | |
| 5,317,441 A | 5/1994 | Sidman | |
| 5,786,975 A | 7/1998 | Duncan et al. | |
| 5,923,830 A | 7/1999 | Fuchs et al. | |
| 6,141,770 A | 10/2000 | Fuchs et al. | |
| 6,330,627 B1 | 12/2001 | Toda | |
| 6,401,159 B1 | 6/2002 | Wang | |
| 6,424,177 B1 | 7/2002 | Hairapetian | |
| 6,921,051 B2 | 7/2005 | Lopata et al. | |
| 7,260,742 B2 * | 8/2007 | Czajkowski | 714/21 |
| 7,343,579 B2 * | 3/2008 | Coxe et al. | 716/16 |
| 7,428,473 B2 * | 9/2008 | Rodriguez et al. | 702/185 |
| 2006/0020774 A1 * | 1/2006 | Ramos et al. | 712/226 |
| 2006/0145722 A1 | 7/2006 | Plants | |
| 2007/0022318 A1 * | 1/2007 | Copenhaver et al. | 714/11 |
| 2008/0256375 A1 * | 10/2008 | Haque et al. | 713/324 |

OTHER PUBLICATIONS

Ramos et al. "Environmentally adaptive fault tolerant computing (EAFTC)." 2005 IEEE Aerospace Conference. Mar. 5-12, 2005.*

* cited by examiner

*Primary Examiner*—Philip Guyton
(74) *Attorney, Agent, or Firm*—Fogg & Powers LLC

(57) ABSTRACT

A system of circumvention and recovery in a multi-function system. The system includes a plurality of peripherals, at least one event detector and a controller. The plurality of peripherals have different levels of susceptibility to environmental events. The at least one event detector is configured to detect environmental events. The controller is coupled to receive an event detected signal from the at least one event detector. The controller is further configured to control circumvention procedures of each peripheral based on the detected event and the level of susceptibility of the peripheral.

17 Claims, 2 Drawing Sheets

SYSTEM OF CIRCUMVENTION AND RECOVERY IN A MULTI-FUNCTION SYSTEM

CROSS REFERENCE REFERENCES

The present application is related to applications having patent application Ser. Nos. 11/672,061, 11/672,056, and 11/672,065 which are herein filed on the same day and are incorporated in their entirety by reference in this application.

BACKGROUND

Mission application systems that use commercial off the shelf components (COTS) are prone to failure when they experience hostile environments. For example, the performance of a typical COTS processor that is exposed to certain levels of radiation may suffer, due to latch-up that may result in total loss of processor activity. To accommodate for the effects of radiation, radiation hardened processors have been developed. The performance of these types of processors is not affected by the radiation of various levels. However, radiation hardened processors in comparison to COTS have their limitations, in terms of size, weight, power, instruction per second combined with high cost. With increasing processing demand, this limited Radiation hardened processing dictates the application that can be flown in space. The lack of processing performance of radiation hardened processors is especially crucial in mission application systems designed to travel in space where the speed of processing is an issue.

For the reasons stated above and for other reasons stated below which will become apparent to those skilled in the art upon reading and understanding the present specification, there is a need in the art for a system that effectively deals with hostile environments without sacrificing necessary performance to complete a mission.

SUMMARY OF INVENTION

The above-mentioned problems of current systems are addressed by embodiments of the present invention and will be understood by reading and studying the following specification. The following summary of an embodiment is made by way of example and not by way of limitation. It is merely provided to aid the reader in understanding some of the aspects of the invention. In one embodiment, a multi-functional system is provided. The system includes a plurality of peripherals, at least one event detector and a controller. The pluralities of peripherals have different levels of susceptibility to environmental events. At least one event detector is configured to detect environmental events. The controller is coupled to receive an event detected signal from the at least one event detector. The controller is further configured to control circumvention procedures of each peripheral based on the detected event and the level of susceptibility of the peripheral.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a multi-function system that includes a circumvention and recovery system. The circumvention and recovery system detects disruptive events and employs appropriate safeguards in peripheral equipment that is based on the peripheral's level of susceptibility to a detected event and returns the peripherals to normal operations after the event has finished or reached a level that no longer presents a threat. Circumvention includes but is not limited to any mitigation action performed to protect electronic circuits, processors, and components from being damaged due to external environments. Examples of actions include but are not limited to removing power from circuits and/or performing circuit resets such that circuits are protected during the event. In one embodiment, a controller employs an environmentally hardened processor. The system uses the hardened processor to perform critical and moderate control functions such as vehicle navigation and house keeping while performing system health checks during radiation events. One or more hardened processor may be used. Another embodiment uses a controller that employs two processors, an environmentally hardened processor and a COTS high speed processor. The system uses the hardened processor as the controller during radiation events and the high speed COTS processor during normal operations.

Figure 1:
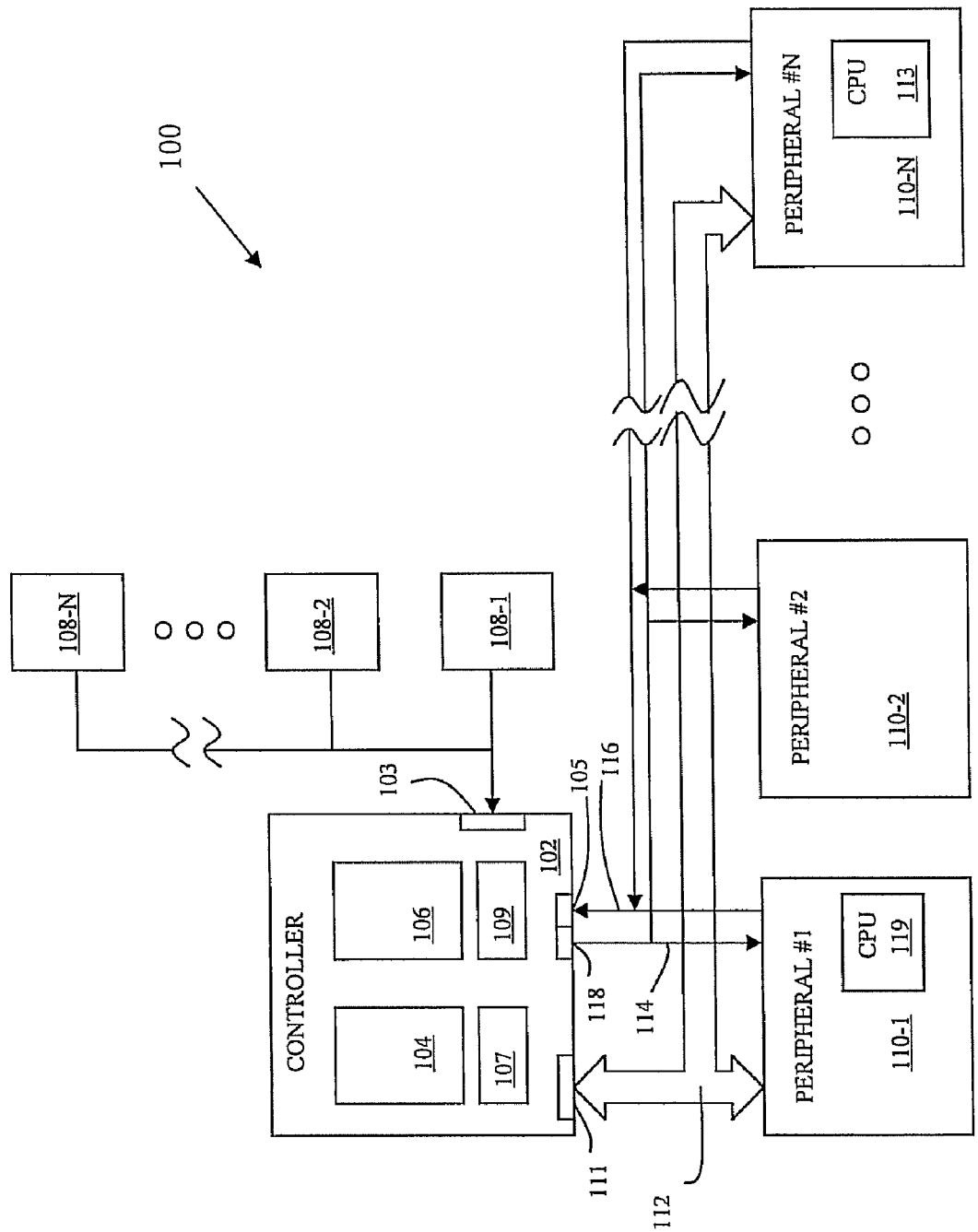
FIG. 1 is a block diagram of a multi-functional system having a system of circumvention and recovery of one embodiment of the present invention.

Referring to FIG. 1, a multi-function system 100 of one embodiment of the present invention is illustrated. The multi-function system 100 includes a controller 102, event detectors 108 (1-N), peripherals 110 (1-N), communication channel 112 and read and write peripheral control channels 114 and 116. As illustrated, the controller 102 is in communication with the event detectors 108 (1-N). FIG. 1 illustrates a plurality of event detectors 108 (1-N). In embodiments, one or more event detectors 108 (1-N) are used to detect events, such as radiation. Other types of event detectors are contemplated such as, but not limited to, water detectors, chemical detectors, radiation detectors, vibration detectors, thermal detectors and the like. In fact, any type of detector that detects an event that is detrimental to the performance of the controller 102, the peripherals 110 (1-N) or the channels 112, 114 and 116 call be used. Moreover, different types of event detectors 108 can be used in a single system. That is, event detector 108-1 may be a different type of event detector than 108-2. When an event detector 108 (1-N) detects an event, a signal indicating the detection is communicated to the controller 102 through port 103. Based on the received event signal, the controller 102, controls functions of the peripherals 110 (1-N) for optimal performance during the detected event or events. Once the event, or events, are over or determined to no longer be a threat, normal operating functions are restored by the controller 102. In one embodiment, an end of event is detected by one of the event detectors 108 (1-N) and communicated back to the controller 102. In another embodiment, an event timer 107 is used to determine the end of an event. This embodiment is used when the length of an event can be accurately predicted. Other embodiments, use other commonly know methods of determining the end of an event.

The controller 102 in the embodiment of FIG. 1 has two processors, a normal relatively high speed processor 104 that is susceptible to events that is used during normal operations and an environmentally hardened processor 106 designed to work even during an event. The controller 102 will change operation from the normal processor 104 to the hardened processor 106 based on the detected event. In one embodiment, the environmentally hardened processor 106 is a radiation hardened processor. In one embodiment, the controller 102 includes a memory 109 to store critical information used by the peripheral 110 when the peripheral 110 is shut down. In embodiments of the present invention, the controller 102 applies predefined or dynamic safeguards to the peripherals 110 (1-N) based on the peripherals 110 ability to withstand the detected event. Hence the susceptibility of each peripheral is used to determine the safeguards that are implemented on the peripheral. Once the event is over or determined to no longer be a threat, the controller 102 returns each peripheral 110 back to full function. In one embodiment, the controller 102 has one or more environmentally hardened processors 106 and no relatively high speed processor.

In embodiments of the present invention the peripherals 110 (1-N) are mixed between peripherals with COTS, peripherals that include all environmentally hardened components and peripherals that include both COTS and environmentally hardened components. Hence, the ability of each peripheral to handle a detected event will vary. As stated above, the controller 102 applies predefined safeguards to the peripheral 110 based on there ability to handle the event detected. The controller 102 is in communication with the peripherals via peripheral control read channel 116 and a peripheral control write channel 114 through respective ports 105 and 118. In one embodiment, enable/disable signals are communicated across the control write lines 114. Verification of the enable/disable signals are communicated across the control read lines 116. In one embodiment, the controller 102 controls the peripherals individually. In another embodiment, the controller controls similar peripherals simultaneously.

Further illustrated in FIG. 1 is communication channel 112. Communication channel 112 is used to communicate between the controller 102 and peripherals 110 that have CPU's such as peripherals' 110-1 and 110-N via port 111. As illustrated Peripherals' 110-1 and 110-N include CPU's 111 and 113 respectfully. The communication channel 112 allows for the communication with and control of the respective CPU 119 and 113 by the controller 102. If a CPU 119 and 113 is to be shut down as the result of a detected event, vital data is stored in memory 109 of controller 102. When the event is over, the stored vital data is retrieved and sent back to the respective CPU 119 and 113. Communications between the controller and the peripherals 110 (1-N) are further described in the commonly assigned application having patent application Ser. Nos. 11/672,056, and 11/672,065 herein filed on the same day and incorporated herein by reference.

In one embodiment of the present invention, peripherals with CPU's 119 and 113 that are performing vital functions during a detected event are allowed to continue while they are functioning properly. In this embodiment the controller 102 repeatedly monitors the respective CPU 119 and 113 to ensure it is functioning properly. If its performance becomes effected, the peripheral is shut down. Monitoring the health of a CPU during an event is further described in the commonly assigned application having the patent application Ser. No. 11/672,061 herein filed on the same day and incorporated herein by reference.

Figure 2:
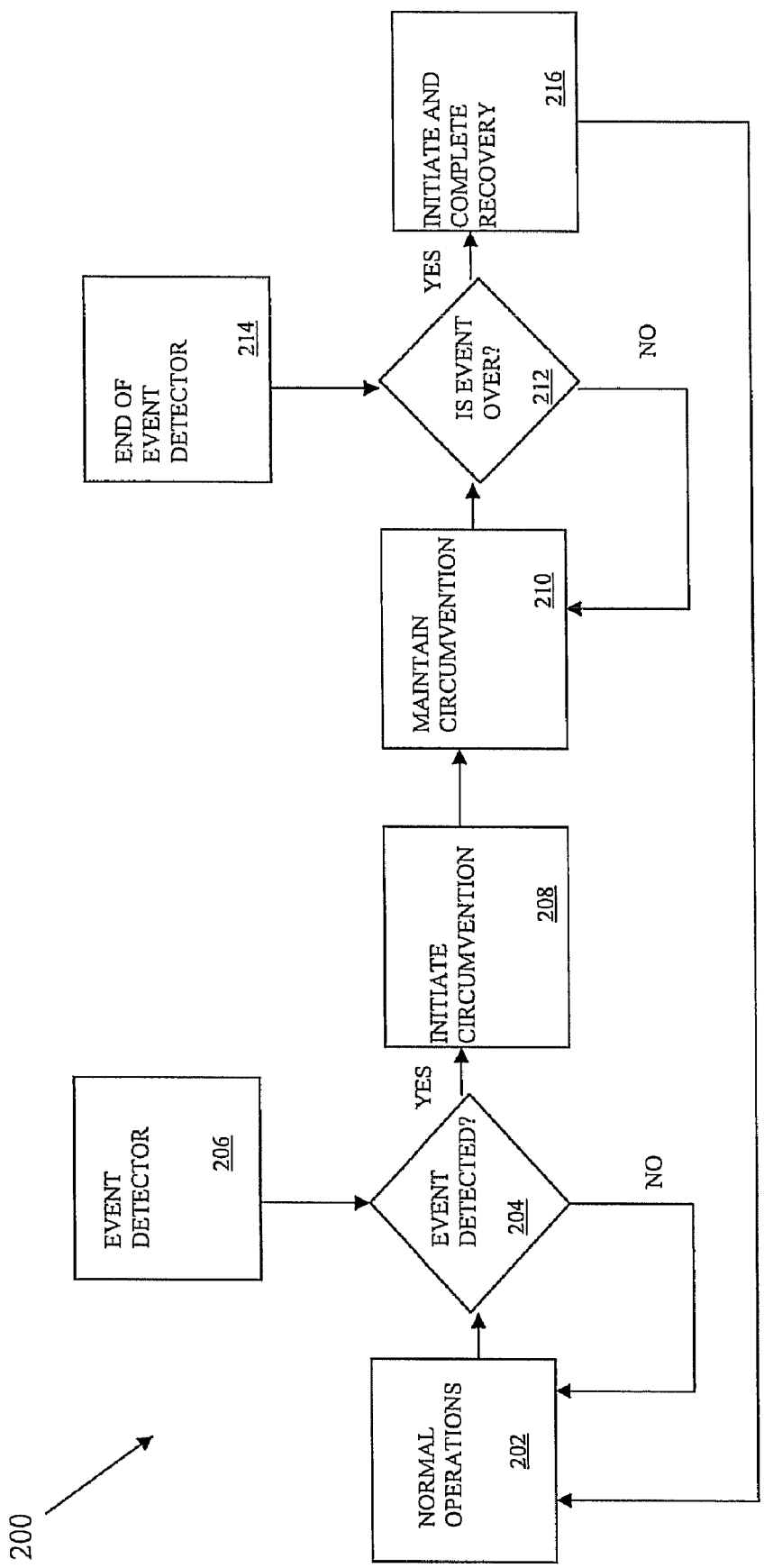
FIG. 2 is a circumvention flow diagram of one embodiment of the present invention.

FIG. 2 illustrates a circumvention flow diagram 200 of one embodiment of the present invention. As illustrated, the diagram 200 starts in normal operations at step (202). An event detector 206 is used to detect events. As discussed above, the event detector 206 can be any type of detector configured to detect an event that could hamper the function of the system. If no event is detected by the event detector 206 at step 204, normal operations are continued at step (202). If, however, an event is detected at step 204, an initiate circumvention step (208) occurs. During this step (208), as discussed above, the controller directs each peripheral in the system to take circumvention steps according to the level of threat posed by the event and the ability of the peripheral to withstand the event. The circumvention is maintained at step (210). An end of event detector 214 is used to determine if the event is over. As discussed above, the end of event detector may be the same or another event detector that is polled, a timer or any other device known in the art to detect the end of an event. If it is determined that the event is not over at step (211), the circumvention is maintained. If it is determined that the event is over at step (212), recovery to normal operations is initiated and completed at step (216). In embodiments of the present invention, the circumvention is not limited to a one time event. Moreover, embodiments can handle multiple events that overlap in time.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A multi-function system, the system comprising:
   a plurality of peripherals having different levels of susceptibility to environmental events;
   at least one event detector configured to detect environmental events; and
   a controller including a commercial off the shelf (COTS) processor and an environmentally hardened processor, the controller being coupled to receive an event detected signal from the at least one event detector, the controller further configured to control circumvention procedures of each peripheral based on the detected event and the level of susceptibility of the peripheral, and wherein the controller is configured to utilize the environmentally hardened processor when an event is detected.

2. The system of claim 1, further comprising:
   an end of event detector in communication with the controller, the controller configured to restore normal operations of the plurality of peripherals based on an end of the event signal from the end of event detector.

3. The system of claim 2, wherein the end of event detector is one of a timer and an event detector.

4. The system of claim 1, wherein the environmentally hardened processor is a radiation hardened processor.

5. The system of claim 1, wherein the at least one event detector is at least one of a radiation detector, a water detector, a chemical detector, vibration detector and thermal detector.

6. The system of claim 1, further comprising:
a control write channel providing communication from the controller to the plurality of peripherals; and
a control read channel providing communication between the plurality of peripherals and the controller.

7. The system of claim 1, wherein at least one peripheral includes a central processing unit (CPU).

8. The system of claim 7, further comprising:
a communication channel providing communications between the controller and the CPU of the at least one peripheral.

9. The system of claim 8, wherein the controller further comprising a memory configured to selectively store data from the CPU of the at least one peripheral.

10. A controller for a multi-function system, the controller comprising:
at least one event signal port configured to receive a event signal from at least one event detector;
a control read channel port configured to receive signals from a plurality of peripherals;
a control write channel port configured to send control signals to the plurality of peripherals;
a first processor in communication with the at least one event signal port, the control read channel port and the control write channel port, the first processor configured to process event signals and to generate control signals to the peripherals based on received event signals; and
a second processor, the second processor environmentally hardened and configured to replace the first processor if it is determined the first processor is susceptible to an event detected, and wherein the control signals implement a circumvention process in each peripheral based on the peripherals susceptibility of the event detected and implements a recovery process when the event is over.

11. The controller of claim 10, further comprising:
a memory configured to store critical information of at least one peripheral during a circumvention process.

12. The controller of claim 10, further comprising:
a timer configured to determine the end of an event.

13. The controller of claim 10, further comprising:
a communication port configured to provided communication between the controller and peripherals with central processing units.

14. A method of operating a multi-functional system having a plurality of peripherals having various levels of susceptibility to events, the method comprising:
detecting at least one event;
implementing circumvention procedures on each peripheral susceptible to the at least one event based at least in part on the susceptibility of the peripheral to the at least one event;
detecting the end of the at least one event;
implementing restoring procedures on each peripheral susceptible to the at least one event to restore each peripheral to normal operations after the detection of the end of the at least one event; and
allowing at least one peripheral to continue functions after detection of the at least one event until the functions of the at least one peripheral become unreliable.

15. The method of claim 14, further comprising
storing critical data of at least one peripheral in a memory during the circumvention procedures; and
retrieving the critical data of the at least one peripheral from the memory during the restoring procedures.

16. The method of claim 14, further comprising:
determining the level of susceptibility of the peripherals.

17. The method of claim 14, further comprising:
using an environmentally hardened processor to implement the circumvention procedures.

* * * * *